United States Patent
Kim

(10) Patent No.: US 10,972,040 B2
(45) Date of Patent: Apr. 6, 2021

(54) MULTI POLE AND MULTI SLOT MOTOR CONTROL APPARATUS AND METHOD

(71) Applicant: MANDO CORPORATION, Gyeonggi-do (KR)

(72) Inventor: Tae Sik Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/578,234

(22) Filed: Sep. 20, 2019

(65) Prior Publication Data

US 2020/0099328 A1 Mar. 26, 2020

(30) Foreign Application Priority Data

Sep. 21, 2018 (KR) .................. 10-2018-0113604

(51) Int. Cl.
*H02P 29/028* (2016.01)
*H02P 27/06* (2006.01)

(52) U.S. Cl.
CPC ............ *H02P 29/028* (2013.01); *H02P 27/06* (2013.01)

(58) Field of Classification Search
CPC ................................ H02P 29/02; H02P 27/06
USPC .................................................. 318/432, 433
See application file for complete search history.

(56) References Cited

U.S. PATENT DOCUMENTS

| | | | | |
|---|---|---|---|---|
| 6,563,246 B1 * | 5/2003 | Kajiura | ................ | H02K 1/2766 310/162 |
| 7,157,875 B2 * | 1/2007 | Kamen | .................. | A63C 17/12 318/434 |
| 7,806,225 B2 * | 10/2010 | Itoh | ....................... | B62D 5/0403 180/446 |
| 10,483,890 B2 * | 11/2019 | Matsuyama | .......... | B60W 10/06 |

FOREIGN PATENT DOCUMENTS

| KR | 10-2011-0051447 | 5/2011 |
|---|---|---|
| KR | 10-2018-0090430 | 8/2018 |

OTHER PUBLICATIONS

Office Action dated Apr. 6, 2020 for Korean Patent Application No. 10-2018-0113604 and its English machine translation by Google Translate.

* cited by examiner

*Primary Examiner* — David Luo
(74) *Attorney, Agent, or Firm* — Ladas & Parry, LLP

(57) ABSTRACT

A multi-pole and multi-slot motor control apparatus includes a multi-pole and multi-slot motor including a stator and a rotor rotationally driven by the stator. The stator includes a core accommodating the rotor and winding poles protruding toward the rotor from the core and on which coils are wound, inverters connected to the coils wound around the winding poles and applying currents to the coils, and a controller shutting down the inverter connected to the failed coil or inverter and controlling the remaining inverters in a boost-up manner when at least one of the coils and the inverters is failed. Accordingly, output, which is the same as output (Continued)

before the inverters or the coils are failed through boost-up control of the remaining normal inverters even when the inverters or the coils are partially failed, may be provided, and the multi-pole and multi-slot motor may be stably driven regardless of a failure.

8 Claims, 2 Drawing Sheets

MULTI POLE AND MULTI SLOT MOTOR CONTROL APPARATUS AND METHOD

CROSS-REFERENCE TO RELATED APPLICATION

This application claims priority to and the benefit of Korean Patent Application No. 2018-0113604, filed on Sep. 21, 2018, the disclosure of which is incorporated herein by reference in its entirety.

BACKGROUND

1. Field of the Invention

The present disclosure relates to a multi-pole and multi-slot motor control apparatus and a method of controlling a multi-pole and multi-slot motor, and more specifically, to a multi-pole and multi-slot motor control apparatus capable of stably driving a multi-pole and multi-slot motor regardless of a failure and a method of controlling the multi-pole and multi-slot motor.

2. Discussion of Related Art

Generally, a motor includes a stator on which a coil is wound, and a rotor accommodated in the stator to rotate by a magnetic force generated from the coil of the stator.

The above-described motor is driven by applying a current to the coil through an inverter provided in a motor control apparatus.

An electronic circuit including a large number of elements is accompanied in the motor control apparatus for reasons of operation control, power efficiency, and the like.

When failures such as external influence, aging or the like occur in many elements configuring the electronic circuit, a problem in which the motor control apparatus performs an unexpected operation can occur.

Specifically, accidents which occur by the aforementioned reasons in a vehicle can cause damage not only to property but also to lives.

Further, in a conventional motor control apparatus, even when an electronic circuit, for example, an inverter or a coil, is partially failed, an entire system is shut down and thus a motor cannot be driven.

SUMMARY OF THE INVENTION

The present disclosure is directed to providing a multi-pole and multi-slot motor control apparatus capable of providing output, which is the same as output before inverters or coils are failed, to a multi-pole and multi-slot motor through boost-up control of the remaining normal inverters even when the inverters or the coils are partially failed and stably driving the multi-pole and multi-slot motor regardless of a failure, and a method of controlling the multi-pole and multi-slot motor.

The present disclosure is directed to providing a multi-pole and multi-slot motor control apparatus capable of preventing an abnormal flow of currents due to short circuits between the coils by disconnecting connection between shorted coils and inverters through cutoff switches and preventing generation of braking torque, and a method of controlling a multi-pole and multi-slot motor.

Technical problems desired to be solved by the present disclosure are not limited to the above-described problems, and other technical problems which are not mentioned may be apparently understood by those skilled in the art from the specification and the accompanying drawings.

According to an aspect of the present disclosure, there is provided a multi-pole and multi-slot motor control apparatus including: a multi-pole and multi-slot motor including a stator and a rotor rotationally driven by the stator, wherein the stator includes a core configured to accommodate the rotor in a center thereof and a plurality of winding poles configured to protrude toward the rotor from the core and on which coils are wound; a plurality of inverters connected to the coils wound around the plurality of winding poles and configured to apply currents to the coils; and a controller configured to shut down the inverter connected to the failed coil or the failed inverter and control the remaining inverters in a boost-up manner when at least one of the plurality of coils and the plurality of inverters is failed.

Here, the plurality of inverters may include a plurality of U-phase inverters configured to supply U-phase currents, a plurality of V-phase inverters configured to supply V-phase currents, and a plurality of W-phase inverters configured to supply W-phase currents, one of the U-phase inverters, one of the V-phase inverters, and one of the W-phase inverters may be grouped to form each of a plurality of inverter groups, and the controller may compare magnitudes of the phase currents output from the inverters having the same phase in the different inverter groups and compare phases of the phase currents output from the inverters having different phases in the same inverter group to determine whether the inverters are failed.

The multi-pole and multi-slot motor control apparatus may further include cutoff switches connected between the plurality of inverters and the plurality of coils.

Here, the controller may turn off the cutoff switch connected to the shorted coil when a cause of a failure is determined as a short circuit between the coils.

Further, the inverter may include first to fourth switches configured in an H-bridge shape.

In addition, the controller may shut down the failed inverter and apply currents which are (n/(n−f)) times (here, n is the number of slots and f is the number of failed coils or failed inverters) the currents before failure to the multi-pole and multi-slot motor through the remaining inverters when at least one of the plurality of coils and the plurality of inverters is failed.

In addition, the controller may control the inverter configured to output the current having the same phase as the failed inverter in a boost-up manner or increase magnitude of the current output from the inverter having a different phase in the same inverter group with the failed inverter and change the phase of the current.

According to another aspect of the present disclosure, there is provided a method of controlling a multi-pole and multi-slot motor including a stator and a rotor rotationally driven by the stator, wherein the stator includes a core configured to accommodate the rotor in a center thereof and a plurality of winding poles configured to protrude toward the rotor from the core and on which coils are wound, the method including: applying currents to the coils wound around the plurality of winding poles by inverters; determining whether the plurality of coils or the plurality of inverters are failed; and shutting down the inverter connected to the failed coil or the failed inverter and controlling the remaining inverters in a boost-up manner when at least one of the plurality of coils and the plurality of inverters is failed.

The method may further include turning off a cutoff switch connected to the shorted coil among cutoff switches connected between the plurality of inverters and the plurality of coils when a cause of a failure is determined as a short circuit between the coils.

Further, the applying of currents to the coils may include controlling turning on and turning off of first to fourth switches configured in an H-bridge shape in the inverters to apply currents to the coils.

In addition, the controlling of the inverter in a boost-up manner may include shutting down the failed inverter and applying currents which are (n/(n−f)) times (here, n is the number of slots and f is the number of failed coils or failed inverters) the currents before failure to the multi-pole and multi-slot motor through the remaining inverters when at least one of the plurality of coils and the plurality of inverters is failed.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
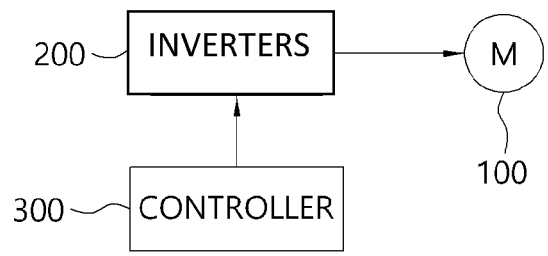
FIG. 1 is a schematic block diagram of a multi-pole and multi-slot motor control apparatus according to an embodiment of the present disclosure.

Hereinafter, exemplary embodiments of the present disclosure will be described in detail with reference to the accompanying drawings which may allow one of ordinary skill in the art to easily perform the present disclosure. The present disclosure may be implemented in various forms and is not limited to the following embodiments. Components not related to the description are omitted in the drawings to clearly describe the present disclosure, and the same reference symbols are used for the same or similar components in the description.

It should be further understood that the terms "include," "including," "provide," "providing," "have," and/or "having" specify the presence of stated features, integers, steps, operations, elements, components, and/or groups thereof, but do not preclude the presence or addition of one or more other features, integers, steps, operations, elements, components, and/or groups thereof.

Figure 2:
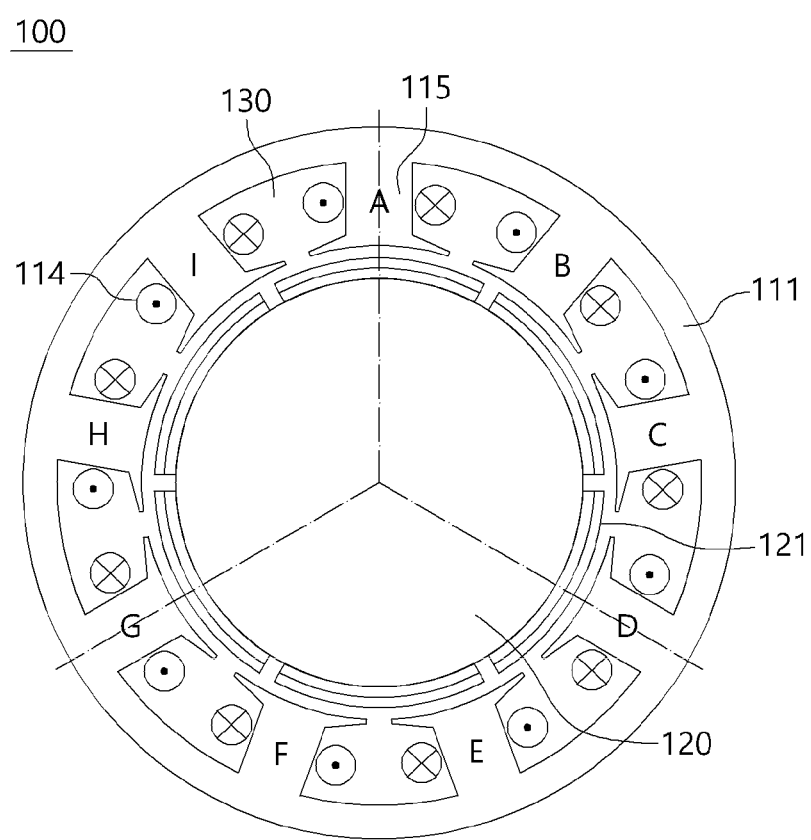
FIG. 2 is a cross-sectional view of a multi-pole and multi-slot motor in FIG. 1.
Figure 3:
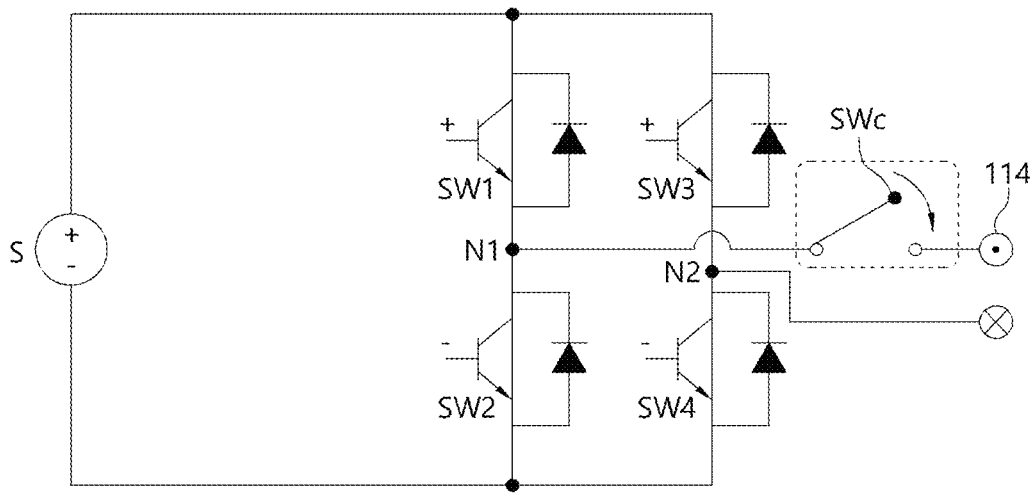
FIG. 3 is a circuit diagram of an inverter according to the embodiment of the present disclosure.

FIG. 1 is a schematic block diagram of a multi-pole and multi-slot motor control apparatus according to an embodiment of the present disclosure, FIG. 2 is a cross-sectional view of a multi-pole and multi-slot motor in FIG. 1, and FIG. 3 is a circuit diagram of an inverter according to the embodiment of the present disclosure.

As shown in FIG. 1, the multi-pole and multi-slot motor control apparatus according to the embodiment of the present disclosure may include a multi-pole and multi-slot motor 100, a plurality of inverters 200, and a controller 300.

Here, as shown in FIG. 2, the multi-pole and multi-slot motor 100 may include a stator 110 and a rotor 120 rotationally driven by the stator 110.

The stator 110 may include a circular or polygonal-shaped core 111 that accommodates the rotor 120 in a center thereof and a plurality of winding poles 115 that protrude toward the rotor 120 from the core 111.

Here, the core 111 and the plurality of winding poles 115 may be integrally formed, and the plurality of winding poles 115 may be formed along an inner circumferential surface of the core 111 at a predetermined interval.

As shown in FIG. 2, the number of winding poles 115 may be nine, and the number of winding poles 115 may be determined according to the characteristic of the multi-pole and multi-slot motor 100.

A coil 114 is wound around each of the plurality of winding poles 115. Further, since the plurality of winding poles 115 are formed at the predetermined interval, a winding slot 130 in which the coil 114 is accommodated is formed between the winding poles 115 which are adjacent to each other. Further, the number of winding slots 130 may be nine, which is as much as the number of winding poles 115, but is not limited thereto.

As shown in FIG. 2, a multipolar permanent magnet 121, for example, a six pole permanent magnet may be disposed on an outer circumferential surface of the rotor 120.

As shown in FIG. 3, the inverters 200 are electrically connected to the coils 114 wound around the plurality of winding poles 115 and apply currents to the coils 114.

The inverters 200 include a plurality of U-phase inverters configured to supply U-phase currents, a plurality of V-phase inverters configured to supply V-phase currents, and a plurality of W-phase inverters configured to supply W-phase currents, and one of the U-phase inverters, one of the V-phase inverters, and one of the W-phase inverters are grouped to form each of a plurality of inverter groups. Here, the U-phase current, the V-phase current, and the W-phase current, which are three-phase currents, each have a phase difference of 120°.

The inverter 200 may include first to fourth switches SW1 to SW4 configured in an H-bridge shape.

Here, each of the first to fourth switches SW1 to SW4 may be a bidirectional switch and may be implemented as one of a metal oxide semiconductor field effect transistor (MOSFET), an insulated gate bipolar transistor (IGBT), a diode, and a combination thereof, but the present disclosure is not limited thereto.

The first and second switches SW1 and SW2 are serially connected to each other, and the third and fourth switches SW3 and SW4 are serially connected to each other. Further, the first and second switches SW1 and SW2 serially connected to each other and the third and fourth switches SW3 and SW4 serially connected to each other may be connected to a power source S in parallel.

In addition, a first node N1 between the first and second switches SW1 and SW2 is connected to one end of the coil 114, and a second node N2 between the third and fourth switches SW3 and SW4 is connected to the other end of the coil 114.

The controller 300 may rotate the multi-pole and multi-slot motor 100 forward by turning on the first switch SW1 and the fourth switch SW4 so that the currents flow through the first switch SW1, the multi-pole and multi-slot motor 100, and the fourth switch SW4. On the contrary, the controller 300 may rotate the multi-pole and multi-slot motor 100 in reverse by turning on the second switch SW2 and the third switch SW3 so that the currents flow through the third switch SW3, the multi-pole and multi-slot motor 100, and the second switch SW2. Further, braking of the multi-pole and multi-slot motor 100 may be performed by turning on the first switch SW1 and the third switch SW3.

The controller 300 may compare magnitudes of the phase currents output from the inverters having the same phase in different inverter groups and compare phases of the phase currents output from the inverters having different phases in the same inverter group to determine whether the inverters are failed. To this end, a current sensor may be provided on an output end of each of the inverters 200.

For example, magnitudes of the U-phase currents output from the plurality of U-phase inverters may be compared to select the U-phase inverter having a relatively different magnitude, and the phase of the U-phase current output from the selected U-phase inverter may be compared with the phases of the phase currents output from the V-phase inverter and the W-phase inverter in the inverter group including the selected U-phase inverter to determine whether the inverter is failed.

When at least one of the plurality of coils 114 and a plurality of inverters 200 is failed, the controller 300 may shut down the inverter 200 connected to the failed coil 114 or the failed inverter 200 and control the remaining inverters 200 in a boost-up manner.

Specifically, when the at least one of the plurality of coils 114 and the plurality of inverters 200 is failed, the controller 300 may shut down the failed inverter 200 and apply currents which are (n/(n−f)) times (here, n is the number of winding slots 130 and f is the number of failed coils 114 or failed inverters 200) the currents before failure to the multi-pole and multi-slot motor 100 through the remaining inverters 200.

For example, when it is determined that the coils 114 wound around an A winding pole 115 and a D winding pole 115 or the inverters 200 connected to the coils 114 are failed, the controller 300 shuts down the inverters 200 connected to the failed coils 114 or the failed inverters 200. Further, the inverters 200 may supply currents, which are 9/7 times the currents before failures thereof, to the coils wound around a B winding pole 115, a C winding pole 115, and the remaining E to I winding poles.

On the other hand, the controller 300 may control the inverters 200 that output currents having a phase the same as that of the failed inverters 200 in a boost-up manner. For example, when one of the plurality of U-phase inverters in the different inverter groups is failed, the remaining U-phase inverters which are not failed may be controlled in the boost up manner to maintain output before the U-phase inverter is failed.

On the other hand, magnitude of the currents output from the inverters 200 having a different phase in the same inverter group with the failed inverter 200 may be increased and the phase may be changed. For example, when the U-phase inverter among the U-phase inverter, the V-phase inverter, and the W-phase inverter in the same inverter group is failed, the magnitude of the currents output from the V-phase inverter and the W-phase inverter which are not failed may be increased and the phase may be changed to maintain output before the U-phase inverter is failed.

Meanwhile, the multi-pole and multi-slot motor control apparatus according to the embodiment of the present disclosure is provided to control the plurality of coils 114 or the plurality of inverters 200 in the case in which the plurality of coils 114 or the plurality of inverters 200 are partially failed, and thus may not be applied when the plurality of coils 114 or the plurality of inverters 200 are entirely failed.

As described above, even when the plurality of coils 114 or the plurality of inverters 200 are partially failed, output, which is the same as output before the inverters 200 or the coils 114 are failed through boost-up control of the remaining normal inverters 200, may be provided to the multi-pole and multi-slot motor 100 even when the inverters or the coils are partially failed, and the multi-pole and multi-slot motor 100 may be stably driven regardless of a failure.

As shown in FIG. 3, the multi-pole and multi-slot motor control apparatus according to the embodiment of the present disclosure may further include cutoff switches SWc connected between the plurality of inverters 200 and the plurality of coils 114.

Here, the cutoff switch SWc may be disposed between the first node N1 and one end of the coil 114, or between the second node N2 and the other end of the coil 114.

The controller 300 may turn off the cutoff switch SWc connected to the shorted coil 114 when a cause of a failure is determined as a short circuit between the coils 114.

As described above, since the controller 300 disconnects connection between the shorted coil 114 and the inverter 200 through the cutoff switch SWc, an abnormal flow of currents due to short circuits between the coils 114 may be prevented and generation of braking torque may be prevented.

Figure 4:
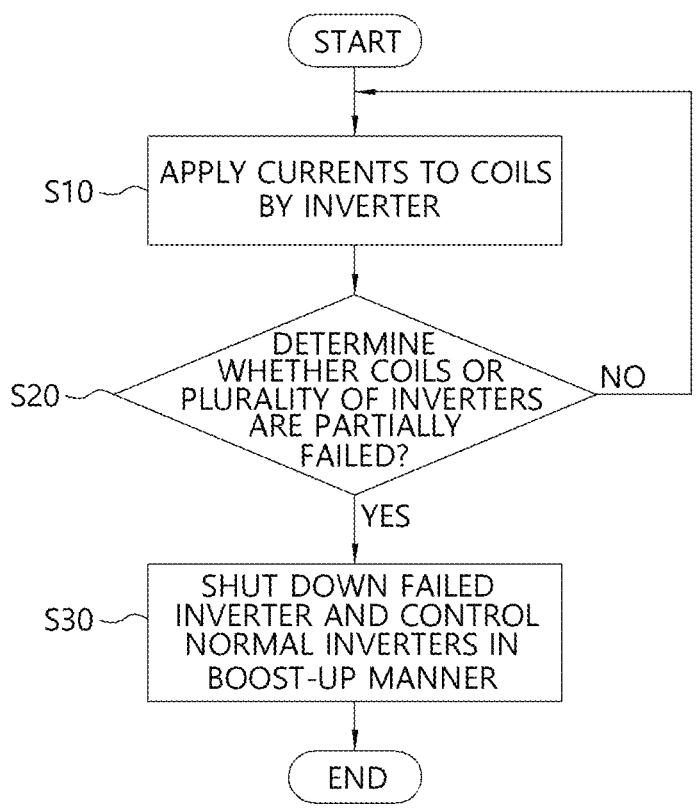
FIG. 4 is a flow chart of a method of controlling the multi-pole and multi-slot motor according to the embodiment of the present disclosure.

FIG. 4 is a flow chart of a method of controlling the multi-pole and multi-slot motor according to the embodiment of the present disclosure.

Hereinafter, the method of controlling the multi-pole and multi-slot motor according to the embodiment of the present disclosure will be described with reference to FIGS. 1 to 4, and contents which are the same as those in the above-described multi-pole and multi-slot motor control apparatus will be omitted.

As shown in FIG. 4, the method of controlling the multi-pole and multi-slot motor according to the embodiment of the present disclosure may include operations of applying currents to the coils 114 wound around the plurality of winding poles 115 by inverters 200 (S10), determining whether the plurality of coils 114 or the plurality of inverters 200 are failed (S20), and shutting down the inverters 200 connected to the failed coils 115 or the failed inverters 200 and controlling the normal inverters 200 in the boost up manner (S30).

The operation of applying currents to the plurality of coils 114 by the inverters 200 (S10) includes applying the currents to the coils 114 by controlling turning on and turning off of the first to fourth switches SW1 to SW4 configured in an H-bridge shape in the inverters 200.

While determining whether the plurality of coils 114 or the plurality of inverters 200 are failed (S20), when it is determined that all the plurality of coils 114 and the plurality of inverters 200 are normal, the inverters 200 may continuously provide the currents to the plurality of coils 114 (S10).

However, when it is determined that at least one of the plurality of coils 114 and the plurality of inverters 200 is failed, the inverter 200 connected to the failed coil 114 or the failed inverter 200 may be shut down and the remaining inverters 200 may be controlled in the boost up manner (S40).

Specifically, in controlling the normal inverters 200 in the boost up manner (S30), when at least one of the plurality of coils 114 and the plurality of inverters 200 is failed, the failed inverter 200 may be shut down and the currents which are (n/(n−f)) times (here, n is the number of winding slots 130 and f is the number of failed coils 114 or failed inverters 200) the currents before failure may be applied to the multi-pole and multi-slot motor 100 through the remaining inverters 200.

As described above, even when the plurality of coils 114 or the plurality of inverters 200 are partially failed, the output, which is the same as the output before the inverters 200 or the coils 114 are failed through the boost-up control of the remaining normal inverters 200, may be provided to the multi-pole and multi-slot motor 100 even when the inverters or the coils are partially failed, and the multi-pole and multi-slot motor 100 may be stably driven regardless of the failure.

Meanwhile, the method of controlling the multi-pole and multi-slot motor according to the embodiment of the present disclosure is provided to control the plurality of coils 114 or the plurality of inverters 200 in the case in which the plurality of coils 114 or the plurality of inverters 200 are partially failed, and thus may not be applied when the plurality of coils 114 or the plurality of inverters 200 are entirely failed.

The method of controlling the multi-pole and multi-slot motor according to the embodiment of the present disclosure may further include turning off the cutoff switch SWc connected to the shorted coil 114 among the cutoff switches SWc connected between the plurality of inverters 200 and the plurality of coils 114 when the cause of the failure is determined as the short circuit between the coils 114.

As described above, since the controller 300 disconnects connection between the shorted coil 114 and the inverter 200 through the cutoff switch SWc, the abnormal flow of the currents due to the short circuits between the coils 114 may be prevented and the generation of the braking torque may be prevented.

According to the present disclosure, output, which is the same as output before inverters or coils are failed through boost-up control of the remaining normal inverters, can be provided to a multi-pole and multi-slot motor even when the inverters or the coils are partially failed, and the multi-pole and multi-slot motor can be stably driven regardless of a failure.

According to the present disclosure, since connection between shorted coils and inverters through cutoff switches is disconnected, an abnormal flow of currents due to short circuits between the coils can be prevented and generation of braking torque can be prevented.

Effects of the present disclosure are not limited to the above-described effects and unmentioned effects may be apparently understood by those skilled in the art from following disclosures.

Although one embodiment of the present disclosure is described above, the spirit of the present disclosure is not limited to the embodiment shown in the description, and although those skilled in the art may provide other embodiments due to addition, change, or removal of the components within the scope of the same spirit of the present disclosure, the above embodiments are also included in the scope of the spirit of the present disclosure.

What is claimed is:

1. A multi-pole and multi-slot motor control apparatus comprising:
   a multi-pole and multi-slot motor including a stator and a rotor rotationally driven by the stator, wherein the stator includes a core accommodating the rotor and a plurality of winding poles protruding toward the rotor from the core and on which coils are wound;
   a plurality of inverters connected to the coils wound around the plurality of winding poles and configured to apply currents to the coils;
   a controller configured to shut down the inverter connected to the failed coil or the failed inverter and control the remaining inverters in a boost-up manner when at least one of the plurality of coils and the plurality of inverters is failed; and
   cutoff switches connected between the plurality of inverters and the plurality of coils,
   wherein the controller turns off the cutoff switch connected to the shorted coil when a cause of a failure is determined as a short circuit between the coils.

2. The multi-pole and multi-slot motor control apparatus of claim 1, wherein the inverter includes first to fourth switches configured in an H-bridge shape.

3. The multi-pole and multi-slot motor control apparatus of claim 1, wherein the controller shuts down the failed inverters and applies currents which are (n/(n−f)) times (here, n is the number of slots and f is the number of failed coils or failed inverters) the currents before failure to the multi-pole and multi-slot motor through the remaining inverters when at least one of the plurality of coils and the plurality of inverters is failed.

4. A multi-pole and multi-slot motor control apparatus comprising:
   a multi-pole and multi-slot motor including a stator and a rotor rotationally driven by the stator, wherein the stator includes a core accommodating the rotor and a plurality of winding poles protruding toward the rotor from the core and on which coils are wound;
   a plurality of inverters connected to the coils wound around the plurality of winding poles and configured to apply currents to the coils; and
   a controller configured to shut down the inverter connected to the failed coil or the failed inverter and control the remaining inverters in a boost-up manner when at least one of the plurality of coils and the plurality of inverters is failed
   wherein:
   the plurality of inverters include a plurality of U-phase inverters configured to supply U-phase currents, a plurality of V-phase inverters configured to supply V-phase currents, and a plurality of W-phase inverters configured to supply W-phase currents;
   one of the U-phase inverters, one of the V-phase inverters, and one of the W-phase inverters are grouped to form each of a plurality of inverter groups; and
   the controller compares magnitudes of the phase currents output from the inverters having the same phase in different inverter groups and compares phases of the phase currents output from the inverters having different phases in the same inverter group to determine whether the inverters are failed.

5. The multi-pole and multi-slot motor control apparatus of claim 4, wherein the controller controls the inverter configured to output the current having the same phase as the failed inverter in a boost-up manner or increases magnitude of the current output from the inverter having a different phase in the same inverter group with the failed inverter and changes the phase of the current.

6. A method of controlling a multi-pole and multi-slot motor including a stator and a rotor rotationally driven by the stator, wherein the stator includes a core accommodating the rotor and a plurality of winding poles protruding toward the rotor from the core and on which coils are wound, the method comprising:
   applying currents to the coils wound around the plurality of winding poles by inverters;
   determining whether the plurality of coils or the plurality of inverters are failed;

shutting down the inverter connected to the failed coil or the failed inverter and controlling the remaining inverters in a boost-up manner when at least one of the plurality of coils and the plurality of inverters is failed; and turning off a cutoff switch connected to the shorted coil among cutoff switches connected between the plurality of inverters and the plurality of coils when a cause of a failure is determined as a short circuit between the coils.

7. The method of claim 6, wherein the applying of currents to the coils includes controlling turning on and turning off of first to fourth switches configured in an H-bridge shape in the inverters to apply currents to the coils.

8. The method of claim 6, wherein the controlling of the inverter in a boost-up manner includes shutting down the failed inverter and applying currents which are (n/(n-f)) times (here, n is the number of slots and f is the number of failed coils or failed inverters) the currents before failure to the multi-pole and multi-slot motor through the remaining inverters when at least one of the plurality of coils and the plurality of inverters is failed.

* * * * *